Feb. 18, 1964   G. F. SCHERER   3,121,686
LUBRICATING SEALANTS
Filed Dec. 22, 1960
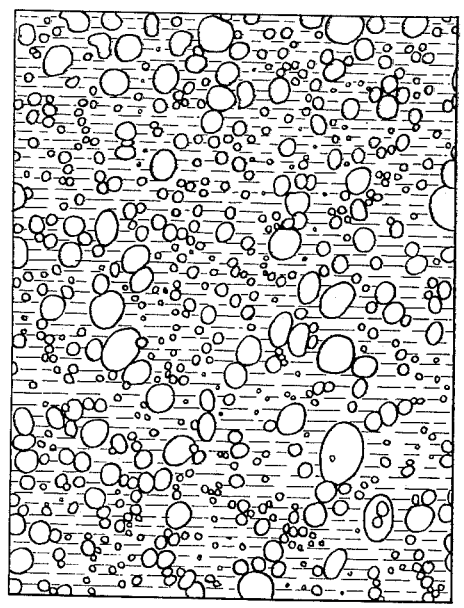
INVENTOR
George F. Scherer
BY *Strauch, Nolan & Neale*
ATTORNEYS

United States Patent Office 3,121,686
Patented Feb. 18, 1964

3,121,686
LUBRICATING SEALANTS
George F. Scherer, San Francisco, Calif., assignor to Rockwell Manufacturing Company, Pittsburgh, Pa., a corporation of Pennsylvania
Filed Dec. 22, 1960, Ser. No. 77,578
4 Claims. (Cl. 252—15)

This application is a continuation-in-part of application Serial No. 623,724 which is a continuation of Serial No. 179,557 filed August 15, 1950, entitled Lubricant (both now abandoned).

My invention relates to sealing and lubricating compositions, and to methods of formulation and production of the compositions. More particularly, my invention and discoveries relate to energizable lubricants and lubricating sealants for use in the sustained or automatic maintenance of sealing and lubricating films on the bearing and seating surfaces of valves, step bearings, oscillating bearings, ball and roller bearings, and sealed gear trains, such as water meter gearing, and the like.

The introduction of the lubricated plug cock with which the lubricants of the present invention are particularly useable brought to the valve field a new conception of pipeline control. In other types of valves, ultimate valve closure is normally effected either by mechanical distortion of the metal seats or by the use of some type of fibrous packing material. The introduction of a plastic sealing material or lubricant between two closely adjacent metal closure surfaces, which limits the rate of flow to a negligible amount, and the providing of means for renewal of this material when necessary, opened up new structural possibilities in positively sealed valves for controlling the flow of fluids in pipelines, and also opened up new requirements and needs in the lubricant field. The lubricant used in a lubricated valve is subject to the destructive action of the line fluid as regards its solvent power and washing power, and, very frequently in industrial service, the effect of elevated temperature or subzero temperatures. Hence, in addition to providing the desired properties of viscosity, wetting power, and thermal resistance, the valve lubricant must maintain these properties to a reasonable degree in the presence of the line fluid. Moreover, since the volume of line fluid passing through the valve may be several million times the volume of lubricant in the valve, it will be obvious that lubricant must be carefully chosen if the line fluid possesses high solvent power or has an appreciable chemical reactivity.

Fortunately, not all valve services combine to a large degree all the conditions pointed out above, and by the selection of basically different types of lubricant, it is possible to cover a very wide range of conditions with a reasonable number of lubricants.

Since the lubricated plug cock is normally operated at a very low velocity of rotation, the required lubricating properties of the valve lubricants are rather easily obtained and attention can be focused on the other required characteristics. So long as a satisfactory film of the sealing plastic can be maintained on the bearing surfaces of the plug cock, the metal surfaces are protected and easy operation may be secured without special regard to the oiliness or friction reducing properties of the lubricant. This varies, of course, with the particular service and size of valves concerned.

In general, for the purposes of considering the lubricant-sealing material of the present invention characterized by the dispersion of small gas bubbles therein, lubricant services may be broken down into four general service groups according to fluids which will contact the lubricant in normal use. These groups involve fluids which are (1) organic solvents, (2) hydrocarbon water mixtures, (3) chemical solutions and (4) gases. The compositions of the present invention have ingredients selected which are particularly resistant to chemical solutions and are therefore preferably used in this service. Applicant has currently other co-pending applications each of which is also a continuation-in-part of Serial No. 623,724 which disclose lubricants for the other above named service groups.

Among the chemical solutions which the lubricants of the present invention are particularly suitable for use with are:

(1) Mineral acids.
(2) Mineral alkalies.
(3) Aqueous solutions of acids, alkalies and salts.
(4) Chemical agents such as chlorine, fused salts, ammonia, phenol, etc.

Lubricated plug valves which are in general use in industry today, present particularly difficult lubricating and sealing problems. In such valves, incompressible plastic lubricants of such viscosity as to be identified as a grease are stored in a reservoir and this reservoir is connected by suitable ducts with surface grooves either on the valve plug or the valve body, or both, for conducting the lubricant to the seating surfaces between the valve plug and body to lessen the turning effort and provide an effective plastic seal between the valve plug and body for preventing leakage of the line fluid under differential pressure. In some of these valves the lubricant is subjected to high pressures when employed to exert a jacking action on the plug to unseat it when frozen or difficult to turn.

Since valve lubricants must be plastic to allow movement of the lubricant through the provided ducts and channels in the valve structure and to permit the forming of a sealing film on the closure surfaces, complete lubrication is not attained unless continuous feeding pressure is applied in sufficient amount to continuously replenish lubricant loss through dissolution in the line fluid, gradual displacement by line pressure, or loss from the lubricant channels in the seating surfaces as they are momentarily exposed in operation, or from other causes.

Normally, in adding lubricant to the valve, either in the form of lubricant sticks, subsequently put under pressure by the lubricant screw, or by injecting lubricant by means of a grease gun, or other contrivance, the lubricant throughout the lubricant reservoir and lubricant passageway is under pressure. As conventional lubricants are incompressible, the lubricant within the valve stops flowing as soon as the extraneous force used for moving the lubricant ceases, and upon the escape of a small fraction of the enclosed fluid the internal lubricant pressure drops rapidly to zero.

Lubricated valves employing the conventional incompressible lubricants are therefore at best only momentarily lubricated at full efficiency, since some of the lubricant forming the lubricant barrier against leakage is in general rapidly displaced due to pressure of the line fluid, dissolution in the line fluid, or other causes. In addition, a portion of the lubricant sealing film is scraped off the sealing surfaces when such valves are operated, and comparatively large volumes of lubricant may be lost due to momentary exposure of certain of the lubricant channels, depending upon the valve design.

Even when additional lubricant is injected into the valve at rather frequent intervals to make up for such losses, during the periods of time between these successive additions of lubricant, the continuity of the lubricant sealing film may be broken permitting leakage of line fluid. If through neglect in replenishing such lubricant as may be lost during the normal operation of the valve, or if comparatively long intervals of time pass between such renewals, not only may excessive leakage develop, but the valve itself may be damaged because of access of the line fluid to working parts of the metal structure, with subsequent corrosion or erosion of these parts, and the valve may be rendered mechanically inoperative.

To maintain complete lubrication and sealing in a valve, the losses of lubricant and sealant in operation must be immediately and continuously replaced, and this is impossible with periodic relubrications using prior methods. Continuous lubrication with and without sealing is also important in a wide variety of other mechanical devices having relatively movable parts. Periodic lubrication of such equipment, even though frequent, at best is inadequate to secure, and does not maintain, continuous effective lubrication or sealing, since the lubricant losses are not immediately replenished.

The unsuccessful prior efforts to meet the demand for maintaining equipment in properly lubricated condition include numerous devices and mechanisms of various types dependent upon external force, including line pressure effects in valves, to mechanically apply feeding pressures to reservoirs of incompressible lubricating and sealing compounds. Such devices are costly and in general either over or under lubricate the equipment, and have been either too cumbersome or expensive for general use. For example, the efforts to keep valves continuously lubricated, generally include mechanisms either built in as part of the valve structure or added to the valve as an additional part of the mechanism.

My present invention and discoveries solve the foregoing problems and meet the above noted demands for certain types of equipment. In lubricated valves this is accomplished without change in, or addition to, the existing structures, and for a wide range of temperatures and services. This I accomplish by making the lubricant and sealant compositions themselves inherently energizable by substantially permanently dispersing gas bubbles therein. Such compositions, when confined in reservoir spaces, are readily flowable solely under their own pressure of energization through the normal filling and distributing channels to the surface areas to be sealed and lubricated, and over these surfaces through the normal operating clearances, to maintain effective sealing and lubricating films by continuous replacement of the losses that occur in normal operation for long periods of time, without however oozing or feeding out excessively from the end clearance areas, thereby maintaining the equipment continuously in optimum operating condition over long periods of time without need of relubrication.

The feeding of lubricants and sealants from reservoirs to bearing and sealing surfaces, requires the application of energy to effect displacement from one location to another. Instead of depending upon the application of extraneous forces furnished by means of mechanical contrivances, such as previously done by compressed springs or by line fluid pressure, I store energy in the composition itself during the act of injecting the lubricant composition into the reservoir, which is then available to provide continuous and automatic replacement of the lubricant seal as it is removed.

In my improved valve sealants and lubricants, I incorporate gases in a stabilized dispersed gas phase, providing energizability under variable pressure, and in which gas bubbles or vesicles of sufficiently small size are dispersed throughout the mass so they will form no breaks across the lubricant grooves or distributing channels, and will permit no deficiency of plastic sealing lubricating material to develop, thus establishing and maintaining an effective sealant and lubricant barrier between the closure surfaces. In other words, the gas bubbles which form the discrete phase are dispersed throughout the mass in units sufficiently small to prevent line fluid channeling through the sealed areas.

Merely including large bubbles or pockets of compressible gas within the lubricant or sealant, or in the storage reservoir, and storing energy in these large gas bubbles by compressing them to a sufficient extent to move the lubricant, will not provide satisfactory means for obtaining the desired result. For example, when large bubbles of compressed gas reach the seating surfaces, leakage paths for line fluid result.

The British patent to Ridgill No. 20,059 of 1907 discloses the idea of combining certain hydrocarbon oils and greases by first blending and melting them together and then subjecting them to a mechanical action such as grinding, beating or pulverizing so as to create a foamy creamy fluid lubricant. This foamy lubricant of Ridgill is not intended to be a compressible and expansible lubricant providing automatic lubrication and cannot be used for the purposes of my invention. Such compositions, as hereinafter set forth in detail, when subjected to compressions sufficient for energization purposes, lose their energizability and expansibility and fail to function automatically to produce sustained lubrication.

Particularly in lubricated valve service, in addition to the pressures and stresses of distribution of the lubricants and sealants through tortuous channels to and over the sealing surfaces, the lubricants and sealants must be operative over wide temperature ranges in service, must resist attack from wide varieties of line fluids, and must in some valve designs withstand the considerably higher pressures required to jack or lift the plugs from their seats in event of freezing or sticking due to corrosion or failure to relubricate adequately, without substantial loss of energizability due to bubble or vesicle rupture.

While energizability in accordance with my invention, even for a short period of time, is beneficial in lubricating and sealing service because of establishment and maintenance of more complete and adequate films over bearing and sealing surfaces due to the dynamic flow through the normal surface clearances and into the interstices and leak paths during the period of energization, and such compositions are contemplated as within the scope of my invention, my preferred compositions will retain their energizability and stored energy over long periods of time under high pressures.

My preferred improved compositions are sufficiently plastic to be injected into the valves and flow through the grooving and distributing ducts in commercially injectable form, and to provide hydraulic jacking while resisting operating and flow strains without bubble rupture or coalescing into large bubbles and leak paths; they will retain elastically deformable bubbles of gas under compression for months and at the same time will wet and adhere adequately to the surfaces to be sealed and lubricated without, however, exuding excessively from the sealing surfaces under the pressure of energization. Notwithstanding the foregoing characteristics these compositions flow readily through the provided distribution passages in the valves. They also resist displacement by high line pressures and over a wide range of temperature.

References in the technical literature to elements favorable to the production of foams or froths such as surface tension, polarity, dust and the like cannot be solely relied upon for the formulation of my improved compositions, and while the initial incorporation of dispersed small gas bubbles in conventional valve lubricants capable of such incorporation has resulted in some improvement, this has not resulted in lubricants having all of the foregoing desirable characteristics in adequate degree for general commercial use in existing designs of lubricated valves.

In the lubricants of the present invention I incorporate a satisfactory degree of compressibility and expansibility, by dispersing throughout the lubricant mass an appreciable amount of discrete small bubbles of compressible gas which is chemically inert with respect to the lubricant matrix, such as air, carbon dioxide, nitrogen, or other fixed gases, to provide energizability in the lubricant mass by subsequent compression of the dispersed gas bubbles. I preferably obtain this dispersion of the gas phase of my lubricant in small discrete bubbles uniformly distributed throughout the mass by dispersing the gas into the lubricant base in a suitable jacketed agitator or mixer within predetermined temperature limits enabling most efficient bubble incorporation. However, incorporation of the desired amount of compressible gas in my lubricant by employing reactive chemicals capable of generating discrete gas bubbles throughout the mass by heating, or by incorporating materials which contain dissolved gas that may readily be evolved by means of heat, chemical reaction, or the like, are also contemplated as within the scope of my invention.

The stability of the dispersion of gas particles, or capability of the composition to retain bubbles, is enhanced by making the lubricant compositions substantially water free resulting in improved performance of the gas retaining, or entraining, agent which is utilized to effect bubble retention in the compositions of the present invention.

The rate of lubricant consumption determines the total amount of energization required to keep valves in a fully lubricated condition for long periods of time. This total amount of available energization in any given composition is determined by the volumetric capacity of the lubricant reservoir in the valve and the pressure to which the lubricant mass is subjected. Therefore, lubricants containing only a small amount of dispersed gas bubbles, say in the neighborhood of 1 percent, require valves with very large lubricant reservoirs and constructional features which permit the use of very high lubricant pressures. To adapt my improved compositions to valves which are already in service, I use compositions containing large amounts of dispersed gas so they can be operated at comparatively low lubricant pressures in the reservoirs already provided in such valves.

Using the conventional plastic incompressible lubricants currently available for plug valves I have found that the volume of gas that can be incorporated and retained for a substantial period in discrete dispersions varies from impractically small amounts up to about 30 percent by volume at ambient temperatures, but that in general the period of retention of energization of the lubricant in actual valve service is comparatively short due to limited retention of the dispersed discrete bubbles. However, in some of my improved compositions I have been able to incorporate up to 50 percent or more by volume of air with substantially permanent bubble stability in service, as will be hereinafter set forth in detail.

While even very small amounts of incorporated discrete gas bubbles are beneficial, as a practical matter I have found it desirable to provide for a conventional plug valve assembly, a preferred range of gas by volume of from 10 percent to 50 percent, depending upon the particular conditions of service and the structural characteristics of the valves used.

It is to be understood that my energizable lubricants, as made available for use in stick or bulk form contain the mass of dispersed discrete gas bubbles at atmospheric pressures at which they are stored or handled. The energy which is available for automatically lubricating the valves is incorporated during injection, or previously energized in separate pressure vessels which can be attached to the valves. At elevated temperatures the relative volume of gas bubbles increases due to expansion and the temperature of service is a determining factor in the volume percentage of gas included.

My improved valve lubricants and sealants in the form of sticks or bulk, when examined superficially, look very much like the ordinary non-energizable valve lubricants heretofore in use, but have a distinctly different appearance under a microscope due to the incorporation of the minute dispersed bubbles of gas.

It is accordingly a primary object of the present invention to provide novel energizable sealing and lubricating compositions and methods of their formulation and production.

Another object of my invention is to provide novel lubricating and sealing compositions containing stable dispersions of small discrete bubbles of compressible and expansible gas, and methods of their formulation and use.

Another object of the invention is the provision of dispersions of small discrete gas bubbles in matrices of plastic sealants and lubricants which are highly stable under repeated compression and expansion for substantial periods of time in service.

A further object of the present invention is to provide lubricants which are particularly resistant to attack from chemical solutions.

Other objects of the invention will be apparent to those skilled in the art from the appended claims, following detailed description, and accompanying drawing which illustrates a magnified diagrammatic view of a film of a preferred lubricating sealant with a dispersion of gas particles therein.

In practice, my starting point for the development of an energizable lubricating and sealing composition for a specific service is to use the best available conventional valve lubricant for that service as an initial basis for comparison of characteristics, and to determine whether a desirable bubble dispersion can be formed in it. If the resultant product is lacking in desirable characteristics, other matrix compositions are prepared of materials deemed most likely to be suitable for the specific service conditions.

Energizable compositions so produced, are first subjected to a preliminary visual examination, specific gravity determination, and microscopic examination. If apparently satisfactory, they are then subjected to actual valve tests. For comparative evaluations of these compositions the test apparatus consists of a standard 2 inch Figure 1924 "Nordstrom" valve, as it was found by experience that compositions showing satisfactory performance in this valve will perform satisfactorily in all other "Nordstrom" valve sizes and types. The performance of the lubricant in the test valve is evaluated on the basis of its ability to maintain the valve in a fully lubricated condition by automatically replenishing given unit quantities of lubricants removed from the valve. The unit of lubricant consumption has been empirically fixed at the complete removal of the amount of lubricant contained in one plug lubricant groove, which is disconnected from the reservoir and exposed to the action of line fluid at a valve body port when turning the valve. Under test, the lubricant is removed from the exposed groove while in a cocked position, and the plug is then returned to full open or full closed position whereupon the empty groove is reconnected with the reservoir, thereby permitting refilling. If the lubricant groove is automatically refilled completely for a minimum of six successive operations, allowing a period of five minutes after closing the valve for each automatic refilling, the lubricant is then subjected to a stability test by again compressing it to a pressure of 1000 p.s.i. and allowing it to remain under compression for a week in the test valve. If the pressure is substantially maintained without loss, it is then considered to possess satisfactory stability. The lubricants that pass this valve test are then subjected to actual service tests.

In the formulation of my improved compositions, in addition to the constituents used, the method of blending as well as the method of incorporating the gas are important in obtaining optimum results. The temperatures of blending, mixing, and gas incorporation in the formulation of my improved compositions as hereinafter set forth are controlled by use of equipment having suitable heating and cooling arrangement.

The degree to which a gas dispersion can be formed in a lubricant of a given composition depends upon its physical characteristics and the procedure followed in regard to cooking temperature, speed and type of agitation, type of equipment used, and the like, in a manner that will be readily apparent to those skilled in the art from a consideration of the technique hereinafter set forth in detail in describing the production of my preferred compositions.

In general the lubricants of the present invention have three constituents, i.e., a base lubricant ingredient, an air entraining agent, and a thickener.

The base lubricant ingredient is preferably a mineral lubricating oil: however, a synthetic lubricating liquid may be used in place of or in addition to mineral lubricating oil.

The mineral oil ingredient in the compositions of the present invention may be any of the hydrocarbon oils of lubricating grade, such as customarily used in compounding greases. The oil may be a refined or semi-refined paraffinic-naphthenic, or asphaltic-base oil having a viscosity in the range of about 85–500 SSU at 100° F. If desired, a blend of oils (mineral or synthetic) of suitable viscosity may be employed instead of a single oil, by means of which any desired viscosity within the range of 85–500 SSU at 100° F. may be obtained. The base ingredient content of my compositions may comprise about 20–65 parts by weight of the total composition. The particular oil, as well as the exact amount of oil employed, depends upon the characteristics desired in the final composition.

The preferred mineral lubricating oils which have been found to give particularly good results are:

Drakeol 21 oil, viscosity 205–215 SSU at 100° F.,
Atreol 21 oil, viscosity 205 SSU at 100° F.,
Atreol 9 oil, viscosity 85 SSU at 100° F., and
Drakeol 35 oil, viscosity 350 SSU at 100° F.

Preferred synthetic lubricating materials useable in my compositions are polyolefins such as polyisobutylene-isobutylene polymers of molecular weight 200–1500.

One or more thickeners are added to my compositions to improve their consistency. In general they are used in amounts sufficient to provide a non-liquid, soft, flowable plastic matrix of suitable viscosity while the gas entraining agents are used in amounts sufficient to entrain the desired amount of gas bubbles in the thickened base lubricant material. In general the thickener is added in about 5–45 parts by weight.

A suitable thickener may be selected from any one of the following materials, or any combination thereof.

Wax insoluble in chemical solutions:

Ozokerite _____ Naturally occurring mineral wax.
Microcrystalline wax _____ Refined petroleum wax.
Polyisobutylene (M.W. 7500–400,000) _____ Solid polymers of isobutylene.
Polyethylene _____ M.W. 1,000–50,000.
Polypropylene _____ M.W. 200,000–500,000.
Mixed terphenyls _____ Mixture of isomeric terphenyls, e.g., ortho-para.
Mica.
Graphite.
Molybdenum disulfide _____ $MoS_2$.

In accord with the present invention, it has been found that the lubricant compositions will not effectively entrain gas particles in the absence of a certain substance and the latter is therefore designated as a gas entraining agent. Such an agent which has been found to provide particularly good results is paraffin which is crystalline wax from petroleum. The paraffin used in my compositions in amounts ranging between about 10–60 parts by weight, may also thicken the composition, but this is merely incidental since its primary importance is in retaining the gas bubbles suspended in the matrix material.

The following examples will serve to illustrate some of my preferred compositions and also the formulation principles of the preferred compositions of the present invention.

| Example 1 | Preferred Range | Preferred Amount |
|---|---|---|
| Mineral Oil | 20–45 | 35 |
| Polyisobutylene (M.W. 7,500–400,000) | 5–30 | 15 |
| Paraffin | 35–60 | 50 |

To manufacture, place paraffin in the mixer, start the agitator, add the polyisobutylene and completely mix. Then add mineral oil slowly in small portions and mix in each added portion until completely uniform before adding the next portion, keeping the mixture in one plastic mass and not broken up. After all of the mineral oil has been added, allow the mixture to agitate until completely homogeneous. Then turn on steam (120 p.s.i.) in the mixer jacket and heat with agitation until the mixture is completely homogeneous and no lumps appear. Then turn off steam and cool the mixture by allowing water to circulate slowly through the mixer's jacket. When the mixture has cooled to 100° F. a sample is tested for specific gravity every half-hour and agitation is continued between 110° F., and 100° F. until the specific gravity shows the desired compressibility, at which time the batch is complete and ready to discharge.

The accompanying drawing illustrates the surface of a lubricant such as that formulated in accord with Example 1 containing gas bubbles shown as black ring like elements according to the present invention in uncompressed condition. The dispersion of discrete gas particles as shown enables the lubricant to be substantially compressed. The white area between the bubbles represents the lubricant matrix.

*Example 2.*—The lubricant of Example 2 was prepared in the same manner as the preferred lubricant set out in Example 1, but has the following formulation:

| | Range | Preferred Amount |
|---|---|---|
| Polyisobutylene, M.W. 200–1,500 | 35–65 | 50 |
| Paraffin | 10–30 | 18 |
| Polyethylene | 5–20 | 15 |
| Mixed Terphenyls | 5–20 | 15 |
| Molybdenum Disulfide | 0–5 | 2 |

Since any base lubricant ingredient can be used with any combination of thickener and gas entraining agent, it is obvious that numerous additional examples of compositions tried can be given. These can be made in accordance with the present invention formulated in the same manner as explained in connection with Example 1. For example, either ozokerite or microcrystalline wax can be substituted in amounts ranging from 5–20 parts by weight for the polyisobutylene in Example 1, or for the mixed terphenyls in Example 2. They can also be added to polyisobutylene and mixed terphenyls within the stated amount. Mica and graphite may be added to the compositions in about 5 to 15 parts by weight in place of or with polyisobutylene, in Example 1, or in place of or with mixed terphenyls in Example 2. Mica can also be substituted for portions of polyethylene and molybdenum disulfide.

The base lubricant ingredient may be varied as desired also. For example, instead of 50 parts polyisobutylene in Example 2, equal parts by weight of polyisobutylene and mineral oil can be used, and the same applies to Example 1. Because these liquids are mutually miscible in all proportions, the proportions stated may be infinitely varied, depending on ultimate fluid properties desired.

In other words, the various ingredients listed above are entirely compatible with each other, and may be intermixed as desired to obtain slight variations in thickness, lubricity or amount of bubble retention and bubble size. Taking a particular service falling within the above described chemical solutions service class, the variable factors such as viscosity, thermal resistance, etc. may be adjusted as desired for the specific service by varying the ingredients as indicated. Lubricants for the chemical solutions service classification provide optimum results under normal conditions when used with a viscosity of between 1500 and 4000 poises (at shear rate of $10^{-1}$ seconds, temperature 75° F.).

The relative gas particle or bubble sizes entrained or permanently trapped in my compositions range in size in the uncompressed lubricants from a maximum diameter of about 100 microns to a minimum diameter of about 1 micron before the lubricant is compressed within the reservoir in or attached to the valve. These gas particles or bubbles constitute discrete, elastic cells which, even in direct mutual contact do not merge together or squash out of the material, as in substances like aerated soap wherein the gas is merely entrained in the colloidal structure or between crystals.

The capacity of a particular lubricant for maintaining gas (preferably air) in large volume in the above described bubble distribution determines the eventual power of the compressed lubricant. Hence, the optimum lubricant is one which provides an adequate film at the eventual bearing surface and contains a maximum volume of gas dispersed throughout in bubbles that remain discrete and stable both in stock prior to use in a valve or the like, and in compression as when energized in a valve or the like. In practice, my materials retain incorporated gas when standing packaged for periods up to six months and more and also retain their energy when compressed for periods up to six months or more.

My improved lubricants are available in the usual commercial plastic stick, bulk, and soft bulk forms. The sticks are inserted into the valve lubricant chambers and compressed by lubricant screws in the usual manner, the bulk forms may be rolled into sticks or injected by screw-type grease guns, and the soft bulk forms are injected by quick-acting or booster-type grease guns in the well known manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lubricating and sealing composition of matter consisting essentially of a plastic matrix containing a multiplicity of small discrete gas particles that remain in stable dispersion in an amount sufficient to render the matrix compressible to a fraction of its original volume and re-expansible under the particular service conditions which the lubricating composition will be used, said matrix consisting essentially of ingredients according to the following formula:

| | Parts by weight |
|---|---|
| Mineral oil | 20–45 |
| Polyisobutylene having a molecular weight of from 7,500 to 400,000 | 5–30 |
| Paraffin | 35–60 |

2. A lubricating and sealing composition of matter consisting essentially of a plastic matrix containing a multiplicity of small discrete gas particles that remain in stable dispersion in an amount sufficient to render the matrix compressible to a fraction of its original volume and re-expansible under the particular service conditions which the lubricating composition will be used, said matrix consisting essentially of ingredients according to the following formula:

| | Parts by weight |
|---|---|
| Polyisobutylene having a molecular weight of 200 to 1,500 | 35–65 |
| Polyethylene | 5–20 |
| Mixed terphenyls | 5–20 |
| Molybdenum disulfide | 0–5 |
| Paraffin | 10–30 |

3. A lubricating and sealing composition of matter containing a multiplicity of small discrete gas particles that remain in stable dispersion in an amount sufficient to render the lubricant matrix compressible to a fraction of its original volume and re-expansible under the particular service conditions which the lubricating composition will be used, said matrix consisting essentially of at least one base ingredient selected from the group consisting of mineral oil and polyolefins having a molecular weight of from 200 to 1500; a thickener in an amount sufficient to render the composition a soft flowable plastic matrix, and paraffin in an amount sufficient to retain said dispersion of gas particles in said matrix.

4. A lubricating and seal composition of matter as defined in claim 3 wherein said thickener is at least one substance selected from the group consisting of:

Ozokerite wax
Microcrystalline wax
Polyolefins having a molecular weight from 7500 to 400,000
Mixed terphenyls
Mica
Graphite
Molybdenum disulfide References Cited in the file of this patent
UNITED STATES PATENTS

| 2,007,137 | Abrams | July 2, 1935 |
| 2,110,503 | Duckham | Mar. 8, 1938 |